Feb. 23, 1971  J. G. KERAMAS  3,564,809
AUTOMATIC HEAT SEAL PACKAGING MACHINE AND METHOD
Filed Oct. 8, 1968  2 Sheets-Sheet 1

INVENTOR.
JAMES G. KERAMAS
BY
Pearson + Pearson
ATTORNEYS

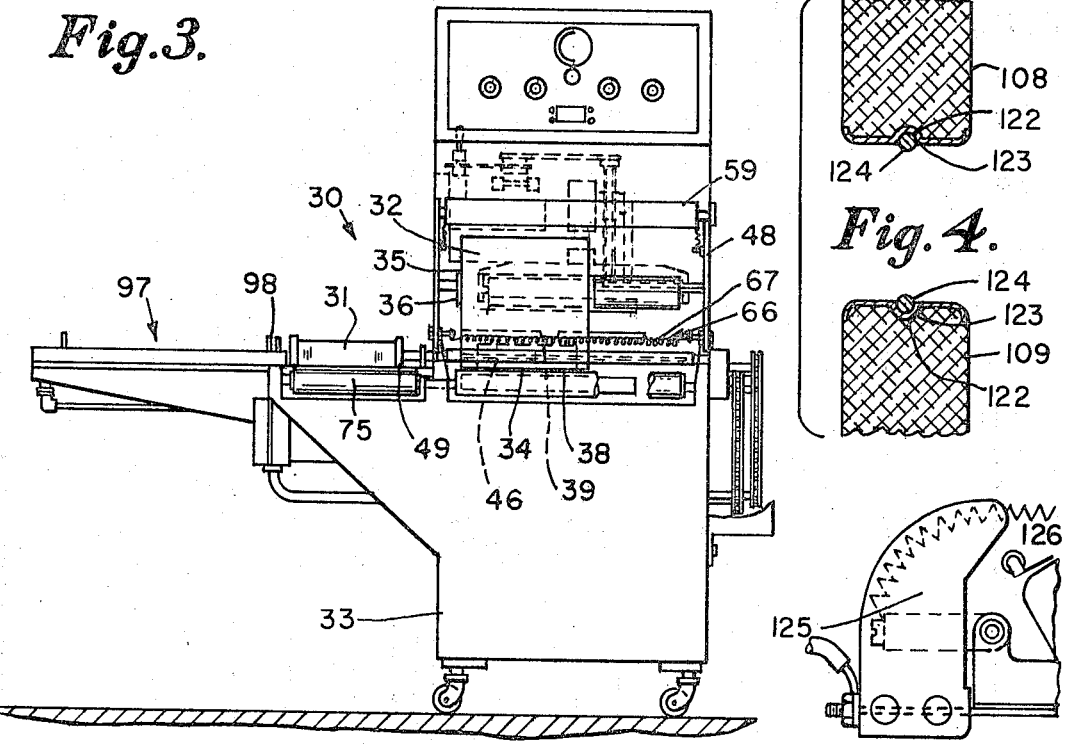
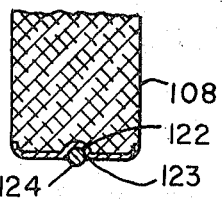
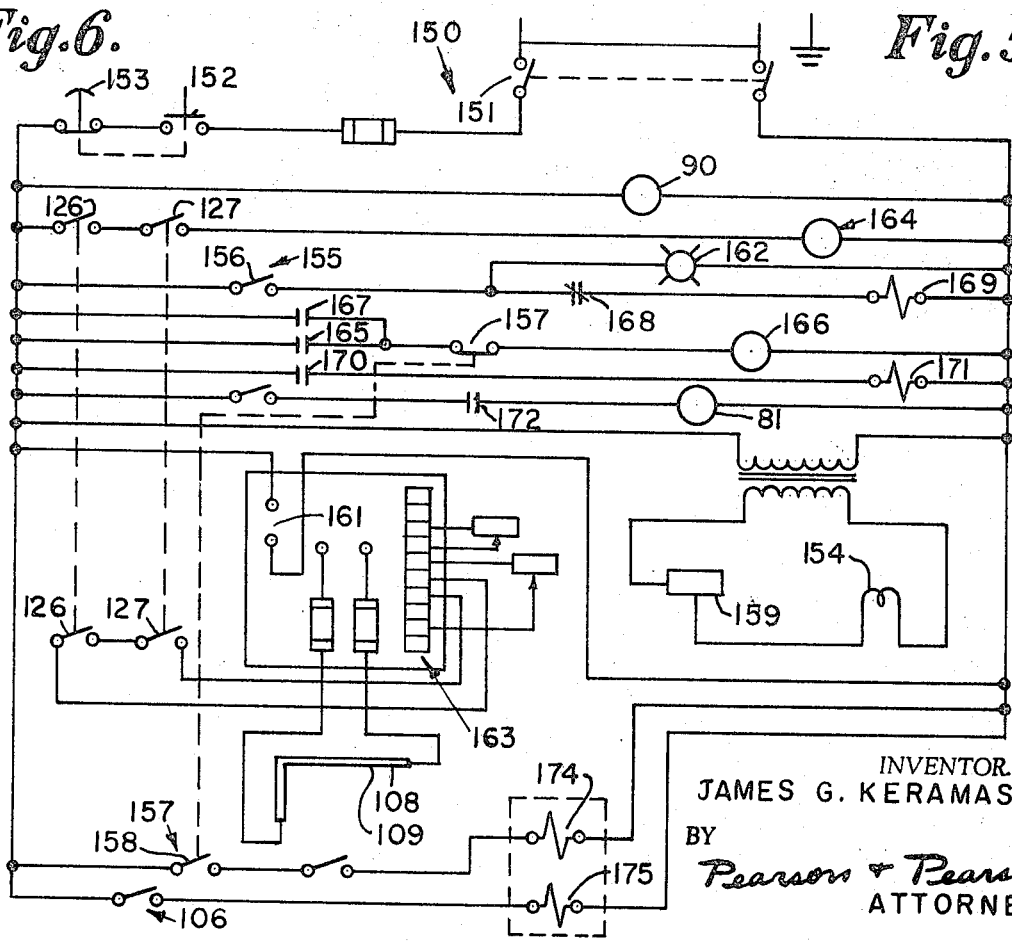
INVENTOR.
JAMES G. KERAMAS
BY
Pearson & Pearson
ATTORNEYS

United States Patent Office 3,564,809
Patented Feb. 23, 1971

3,564,809
AUTOMATIC HEAT SEAL PACKAGING MACHINE AND METHOD
James G. Keramas, 57 Kilby St., Woburn, Mass. 01801
Filed Oct. 8, 1968, Ser. No. 765,819
Int. Cl. B65b 9/06
U.S. Cl. 53—28
12 Claims

ABSTRACT OF THE DISCLOSURE

A package sealer having a pair of oppositely disposed L shaped heat sealing-film severing bars for packaging articles in centre folded, heat sealable plastic film is fully automatic. The successive articles are automatically fed laterally between the plies of the film, then moved longitudinally to between the heating bars for a predetermined dwell during heating and severing and then moved away from the bars. The L shaped heating bars are each supported at three points on pistons of air cylinders, to move toward the centre of the height of each package and apply equalized heating and severing pressure on the film at that height.

BACKGROUND OF THE INVENTION

Figure 1:
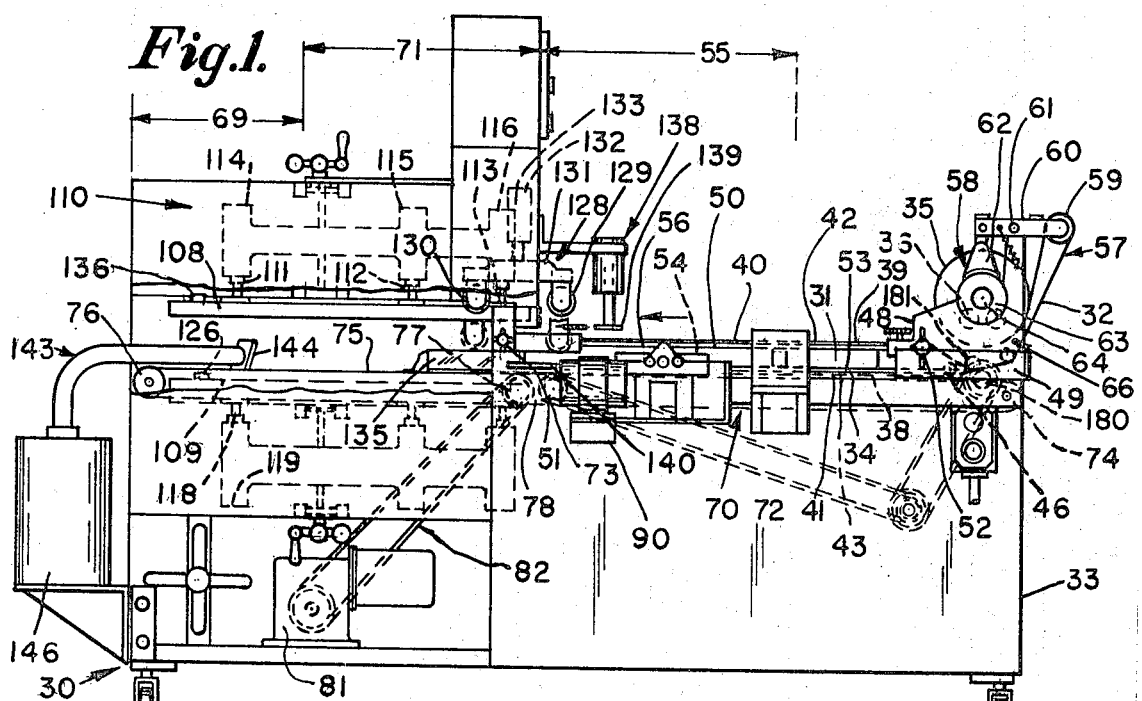

There are many manually operable package sealers presently in use, in which a centre-folded plastic film is manually moved along a platform to a heat sealing station and a separator plate supports the upper ply of the film above the lower ply to create a side opening. An operator manually inserts each article under the plate and between the plies and then manually presses an L shaped upper sealing bar down against an L shaped lower bar whereupon heat is applied to seal the open longitudinal edges of the film and to seal transversely across the film. The upper heating bar is then lifted and the process repeated for the next article.

Typical of such sealing devices are U.S. Patents 3,006,122 to Weishaus of Oct. 31, 1961, U.S. Patent 3,047,991 to Siegal of Aug. 7, 1962, nd U.S. Patent 3,262,833 to Zelnick of July 26, 1966. These machines are characterized by manual actuation and relatively short floor space so that they are useful for small scale packaging.

For large scale packaging of identical articles such as bread, or the like, there are many automatic package sealers which occupy considerable floor space and utilize rolls of unfolded plastic. The flat unfolded plastic web is drawn a path with the side edges gradually up-folded, or downfolded, to form a trough into which the articles are inserted. The film is then overlapped to form a tube, longitudinally heat sealed, the ends tucked in and then closed by crimping or by heat bars. Typical of such large scale, usually continuous, packagers are the machine of U.S. Patent 2,605,597 to Scheib of Aug. 5, 1952 and of U.S. Patent 2,655,777 to Hagen of Oct. 20, 1953.

In this invention a fully automatic package sealer is provided which occupies relatively little floor space and which resembles the above mentioned manual, small-scale, packaging machines in utilizing a roll of center-folded, heat-sealable, plastic film, a separator or spreader to form an article-receiving opening between the unfolded, free side edges of the film and a pair of oppositely disposed L shaped heating bars, one above, and one below, the path of the film. However, the apparatus of this invention is fully automatic, eliminating the need for manual manipulation by an operator, there being power means for delivering successive articles to an infeed station alongside the article receiving opening in the film, power means for infeeding each article to a readiness station within the film, power means for advancing the film-enclosed article to a sealing station between the bars, automatic means for closing the bars, applying an electric heat impulse for a predetermined period and then opening the bars and power means for advancing the sealed package away from the sealing station.

The principal object of the invention is to provide a rugged low cost automatic packaging machine, adjustable for runs of packages of various sizes and capable of indexing individual and successive articles step by step through the various stations to deliver sealed and severed individual film-covered packages to the next apparatus such as a shrink tunnnel or a delivery apron.

Figure 2:
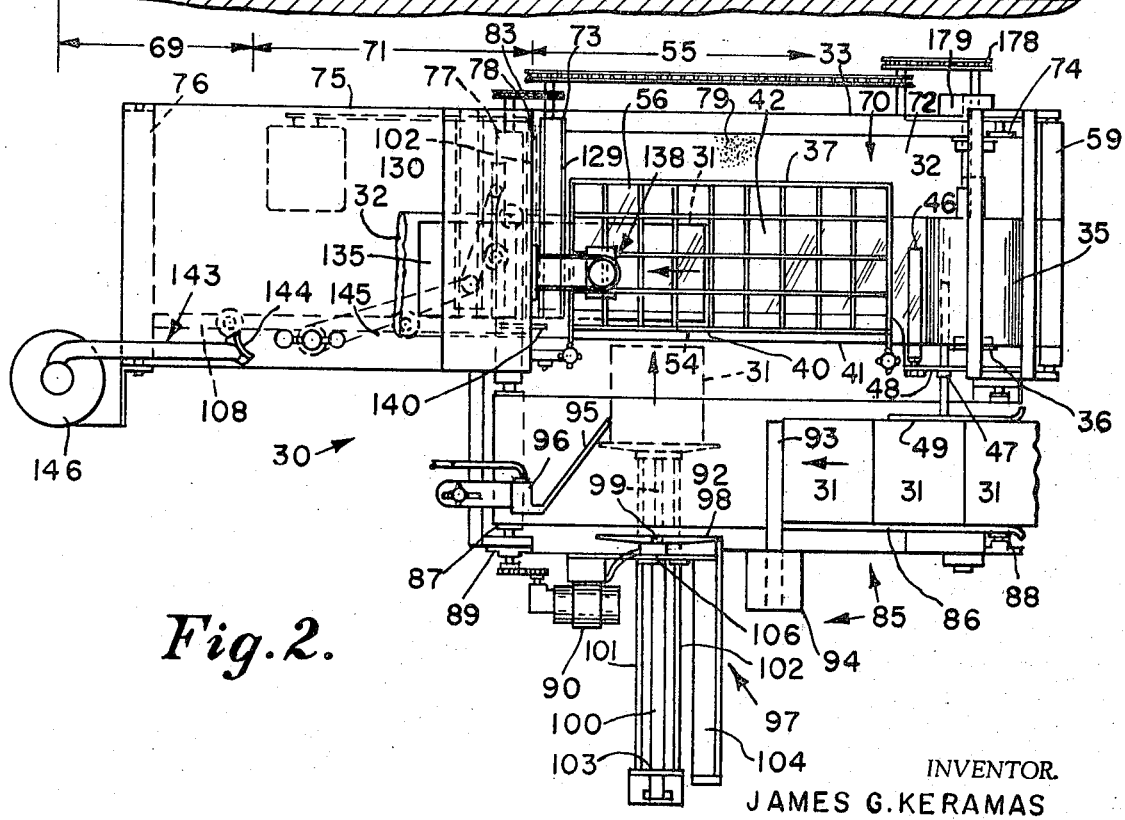

In the drawings
FIG. 1 is a side elevation of the apparatus of the invention,
FIG. 2 is a plan view thereof,
FIG. 3 is an end elevation thereof,
FIG. 4 is an enlarged fragmentary sectional view of one of the heating and severing units,
FIG. 5 is a similar view of the expansion take-up means for the heated wires, and
FIG. 6 is a schematic circuit diagram of the control mechanism.

The fully automatic packaging machine 30 is capable of feeding, wrapping, sealing and severing packages at a rate of forty or more per minute, depending on the length of the articles 31 and on the type of film 32 used. Machine 30 includes the frame 33 having a web path, or package line 34, in a horizontal plane with a supply roll 35, containing an elongated web of center-folded, heat sealable plastic film 32, freely rotatably mounted at one end of the web path 34 in idler roll bearings 36. The film 32 may be of any well known type such as transparent polyethylene, the film being pre-folded prior to winding to form the center-folded, closed, side edge 37, the lower ply 38, the upper ply 39 and the free, terminal, side edges 40 and 41. The upper exterior face of the film is designated 42 and the lower exterior face of the film is designated 43.

A ply separator 46 is mounted along the web path 34 in the form of a cylindrical rod laterally slidable and adjustable by a set screw 47 in an upstanding frame bracket 48, there being an upstanding side guide 49 integral therewith and extending along the article infeed conveyor. Thus the wider the articles being fed, the wider the film and the further into the film the separator rod extends. Also forming part of the ply separator means is a horizontal grille, or plate, 50 extending under the upper ply 39 at a spaced distance above the level of the lower ply 38, and supported on one side only by the vertically adjustable clamp knobs 51 and 52. Lower ply 38 runs under a cantilevered lower plate 53, fixed alongside web path 34 and with grille 50 establishes a package receiving opening 54 between the film plies at the readiness station 55.

A section 56 of the upper ply 39 is thus supported in a horizontal plane at a spaced distance above the horizontal plane of the lower ply 39 on the web path 34 and raising or lowering grille 50 adjusts for a run of articles of greater or lower height.

Dancer roll means 57 and brake means 58 are provided to prevent overrunning of film 32, there being a dancer roll 59 rotatably supported at the end of a lever arm 60, pivoted at 61 and carrying a brake shoe 62 engageable with a disc 63 on the roll shaft 64. Film 32 is trained over the dancer roll and under the slideable rod ply separator 46 so that when tension is exerted on the web 32 to extract film from the roll, the brake shoe 62 is out of contact with disc 63 but when tension is released the brake shoe 62 re-engages the disc 63 and halts rotation of the supply roll 35.

Static elimination means 66 is also provided in the form of a conductive wire or spring 67 extending across the apparatus between the frame brackets 48 and bearing against the film 32 as it is unwound from the roll 35. The frame 33 serves as a ground to disperse the static electricity collected on the wire 67.

Extending along the web path 34 is powered longitudinal conveyor means 70 for advancing each successive article 31 from the readiness station 55 to the heat sealing and severing station 71 and for advancing each article sealed at station 71 away therefrom through discharge zone 69 to the next treatment station or zone, which may be a collection bin, a discharge apron or a shrink tunnel all of well known type and therefore not shown.

Means 70 includes a first endless belt or apron 72, trained over rolls 73 and 74 and a second endless belt or apron 75, trained over rolls 76 and 77, there being a transverse space 78 between the belts to accommodate the transverse portion of a lower heating member. Each belt 72 and 75 has a roughened friction face 79, on the exterior thereof, which engages the lower ply 38 for securing a firm engagement therewith for a purpose to be described.

An electric motor driven, variable speed, gear reduction unit 81 is mounted on frame 33, and connected to the roll 77 by power train 82 for driving belt 75. A power train 83 connects roll 77 to roll 73 for driving belt 72 at the same speed as belt 75.

Powered article infeed means 85 preferably includes at least one endless belt, or apron, 86 extending alongside web path 34 in parallelism therewith, belt 86 being trained around rolls 87 and 88 rotatable in suitable bearings on sidewise extending frame pieces 89. Roll 88 is co-axial with roll 74 and roll 87 is co-axial with roll 73 but belt 86 is preferably driven by a separate motor driven gear reduction unit 90. The infeed belt 86 delivers a plurality of articles 31, in end to end abutting relationship individually and successively from a source not shown to the infeed station 92 which is alongside the package receiving opening 54 and readiness station 55. The belt 86 is continuously driven, rather than intermittent, and does not have a roughened surface so that it slides under the articles when the endmost article is halted by a barrier. Such a barrier is provided in the form of a laterally movable gate 93, which is normally poised outside the path of the articles but which is moved inwardly into the path of the articles by solenoid actuation means 94, to temporarily halt the line of articles while permiting each successive endmost article to advance into infeed station 92. Upon reaching the infeed station, each such endmost article so segregated strikes the elongated actuation arm 95 of limit switch 96. Laterally movable pusher means 97 in the form of a push plate 98, piston rod 99 and pneumatic, double-acting, cylinder 100 is actuated by the closing of switch 96 to push the endmost article at the infeed station 92 through the package receiving opening 54 into the readiness station 55 and between the plies of the centre folded film 32. Pusher means 97 preferably includes a pair of parallel guide rods 101 and 102 slidable in yoke 103 and a gate, or barrier 104, laterally movable with the push plate 98 to serve as a barrier to the advance of additional articles 31 into station 92 when the article in the station 92 is being pushed into the readiness station.

A limit switch 106 is provided on laterally movable yoke 103, which senses the arrival of the push plate 98 at the desired position at the readiness station 55 and causes the laterally movable pusher means 97 to retract back to its normal position alongside the web path 34 at the infeed station 92.

A pair of L shaped heat sealing and severing bars 108 and 109 are located at the heat sealing station 71, the bars being oppositely disposed with upper bar 108 normally poised above web path 34 and lower bar 109 normally poised below the level of web path 34.

Powered actuation means 110 is provided for opening and closing the heating bars, the upper bar 108 being supported by three pistons 111, 112 and 113 each movable in a double acting air cylinder 114, 115 or 116, one piston being located near each end of the bar and one piston being located near the right angular corner. Similarly the lower bar is actuated by three pistons such as 118 operable in these cylinders such as 119, so that heat sealing and severing pressure has three point application and is equalized throughout the length of the L shaped bars. The transversely extending legs, such as 102, of each bar are movable vertically in the space 78 between the conveyor belts 72 and 75.

As best shown in FIG. 4, each bar 108 and 109 includes a groove 122 of semi-circular cross section, coated with a ceramic coating 123 and seating an electric resistance wire 124 of circular cross section. The heat system is of the impulse type which causes the wire to expand when energized, and a pair of pivoted spring biased blocks such as 125 are provided, each mounted at an opposite end of a bar to take up the expansion. When the heating bars have closed, intermediate of the height of the article, with the film clamped therebetween, and the heating of the wires 124 commences, the blocks 125, at full wire expansion, strike a pair of limit switches 126 and 127 which thereupon closes a circuit to the heater control and then to the bar opening circuit and to the circuit which actuates pressure means 128.

The powered film supply means 128 of the invention preferably includes a pair of smooth faced rolls 129 and 130, each freely revolvable in suitable bearings in a yoke member 131, the yoke being supported by a piston 132 slidable in the double acting air cylinder 133. Roll 129 is normally poised above the readiness station 55 and roll 130 is normally poised above the heat sealing station 71, each roll extending transversely of web path 34. There is a film enclosed, heat sealed package 135 at the sealing station 71 and a film enclosed, unsealed, unsecured article 31 at the readiness station 55, with the conveyor belts 72 and 75 halted at the end of each heat cycle. Limit switch 126 on the lower bar 109 has caused the yoke 131 to lower, at the end of the heat seal cycle, so that roll 129 presses against the package at station 55 and roll 130 presses against the package at station 71, thereby increasing the contact of the lower ply 38 with the rough friction face 79 of the belts 72 and 75. Upon reaching its upper retracted position, upper bar 108 strikes limit switch 136 which causes the conveyor belts 72 and 75 to index the package 31 at the readiness station 55 up to the heat sealing station 71 and causes the separated, sealed package 135 to move out of the sealing station 71, along the discharge zone to the next machine. When the conveyors 72 and 75 halt, the pusher means 97 then moves the endmost article 31 into the readiness station and retracts while the heat cycle is taking place.

Powered automatic clamp means 138 is provided in the form of an air cylinder actuated plate 139 which clamps the free edge of the upper ply 39 against the separator grille 50, and an air cylinder actuated arm 140 which clamps the free edge of the lower ply 39 against the roll 73 of belt 72 while the endmost article 31 is being pushed from infeed station 92 into readiness station 55. By this means any wrinkles in the plies 38 and 39 are flattened and the side edge of the article 31 secures a firm, close-fitting seat within the folded side edge 37 of the film 32.

Powered strip collection means 143 is provided which may be in the form of a wind up roll for the waste strip severed from film 32 at the station 71, but which preferably is a suction mouth 144 mounted in the path of the waste strip 145 and leading to a source of suction and collection receptacle 146. A continuous tension is thus exerted on the waste strip 145, regardless of its cross-sectional area, thereby reducing breakage and permitting the minimum size film 32 to be used without fouling the machine 30 with scrap plastic film.

The automatic cycle control means 150, of the invention is shown in the circuit diagram of FIG. 6, wherein 151 is the main switch leading to a suitable power source and 152 and 153 are the mechanically interlocked "start" and "stop" switches, the latter being of the mushroom type to permit quick stopping when desired. A hole burner 154 is included in the circuit and mounted at the heat station 71, to form a hole in the sealed film for the escape of air. A limit switch 155 is mounted at readiness station 55 with the elongated arm 156 thereof in the path of the infed article 31, the closing of the switch causing the heating bars 108 and 109 to close toward each other. A photo cell and light beam, or limit switch 157, is provided in heat sealing station 71, the light beam, or actuation arm 158 being in the path of each successive package arriving at the station for sensing the correct position of the film enclosed article relative to the heating bars and moving the pressure rolls upwardly while halting the conveyors 72 and 75.

In operation, the main switch 151 is closed, thereby energizing hole burner 154 in accordance with control of rheostat 159. The start button 153 is depressed to energize the infeed conveyor belt motor 90, thereby feeding a succession of articles to the infeed station 92. An infed article 31 strikes arm 156 of limit switch 155 at readiness station 55 thereby energizing solenoid 161 and indicator light 162. Energization of solenoid 161 causes the L-shaped bars 108 and 109 to move to closed position. Upon the bars reaching closed position, switches 126 and 127 close to energize the heat circuit controls 163 and to start the timer 164 operating for a predetermined dwell, or period. At the end of the predetermined heating period, which may be about one-half second with the solid state impulse control transistors used, the timer 164 closes contact 165 which energizes relay 166 to close its holding contact 167. Also when relay 166 is energized, it opens contact 168 which de-energizes solenoid 169 to open switch 155 and cause the heating bars 108 and 109 to open. Relay 166 also closes contact 170 to energize solenoid 171 to cause the pressure roll yoke 131 to move down to apply pressure on the articles. Relay 166 also closes contact 172 in the conveyor motor circuit.

When the upper bar 108 reaches the upper limit of retraction, it closes switch 156 in the conveyor motor circuit which starts the conveyor belts 72 and 75 advancing the film enclosed article at station 55 to the sealing station 71. As the package 31 leaves station 55 it opens switch 155 and extinguishes indicator light 162.

When the article 31 arrives at the proper position in sealing station 71, it energizes the normally closed circuit and de-energizes the normally open circuit of the switch. The opening of the normally closed section de-energizes relay 166 thereby opening the relay holding contact 167 while closing contact 168 and opening contact 170 to de-energize solenoid 171.. The hold-down rolls and yoke 131 then move upwardly and the opening of contact 172 halts the conveyor drive 81 of belts 72 and 75.

The closing of the normally open section of switch 106, when an article 31 is in position to be fed laterally from infeed station 92 and is, therefore, closing switch 96, causes solenoid 174 to be energized to actuate the infeed means 85 to push the endmost article 31 to readiness station 55. Upon striking switch 155, the sealing cycle commences with the closing of the heating bars, and solenoid 174 is de-energized because switch 96 has opened when the article left the station. Upon yoke 103 closing switch 106, at the end of the pusher stroke, solenoid 175 is energized to cause retraction of the pusher plate to await the next article 31 at infeed station 92.

The powered film supply means 128 of the invention described above is especially desirable for use with articles which can be pressed from above without damage, such as toothbrushes, games, paper rolls and the like, since the roll pressure tends to eliminate any air bubbles in the plastic. However, as shown in FIG. 1, when the articles are soft, for example pastry or foodstuffs, the rolls 129 and 130 are rendered inoperable and a power train 178 is engaged by a clutch 179 so as to drive a rubber nip roll 180 opposed by a gravity roll 181 to feed the web 32 onto the conveyor mean 70 for advance therewith.

What is claimed is:

1. In apparatus for forming sealed packages, said apparatus being of the type having centre folded, heat sealable film extending along a longitudinal path, a pair of heat sealing members oppositely disposed at a sealing station on said path and a ply separator in advance of said station, to form an article receiving opening, the combination of automatic mechanism for individually and successively indexing articles through said apparatus, said mechanism comprising:

powered longitudinal conveyor means, extending along said film path and including a readiness station in advance of said sealing station, for advancing each successive article from said readiness station to said sealing station and from said sealing station to a discharge zone;

powered article infeed means, mounted alongside said film path and including an infeed station, for moving each successive article from said infeed station laterally through said article receiving opening in said film to said readiness station;

powered actuation means, operatively connected to said heat sealing members at said sealing station, for moving said members substantially in parallelism, vertically into heat sealing engagement in said path, intermediate of the height of each said package and moving said members out of said path;

said powered actuation means including mechanism supporting each said heat sealing member at three points, for equalizing the pressure application thereof;

powered film supply means, delivering said film onto said longitudinal conveyor means at said readiness station to advance therewith;

and article-actuated, cycle-control mechanism operatively connected to all of said powered means for indexing each successive article from station to station on said path, applying said sealing members to said film for a predetermined period and actuating said film supply means after each such period.

2. Apparatus as specified in claim 1, wherein said powered longitudinal conveyor means comprises a pair of article-supporting, endless belts, each with a friction face, said belts defining a transverse space therebetween at said sealing station for the passage of the transverse portion of one of said heat sealing members, and said powered film supply means includes upper and lower rolls, mounted along said path for pressing each package against said friction face.

3. Apparatus as specified in claim 1, wherein said powered article infeed means comprises at least one article-supporting endless belt alongside, and in parallelism with, the path of said film for delivering successive articles to said infeed station, laterally movable gate means for segregating each endmost article and laterally movable pusher means for infeeding each said endmost article through said opening in said film to said readiness station.

4. Apparatus as specified in claim 1, wherein said heat sealing members are L shaped, each with a groove of half round section extending therealong, a ceramic coating lining said groove and an electric resistance wire of circular cross section seated in said coated groove, said wire heat sealing said film while also severing the same.

5. Apparatus as specified in claim 4, wherein said three point support mechanism of said powered actuation means includes at least three cylinder and piston elements supporting each said L shaped heating member, one proximate each end, and one proximate the right angular corner thereof, for equalizing the sealing and severing pressure of said members.

6. Apparatus as specified in claim 1, wherein said powered film supply means includes a pair of freely revolvable rolls, one roll normally poised above said film path at said readiness station, and one normally poised above said film path at said sealing station, said rolls being movable downwardly to engage the upper ply of said centre folded film to apply relatively frictionless pressure on the film enclosed article passing thereunder.

7. Apparatus as specified in claim 1, plus: power operated clamp means mounted along said path at said infeed station, said means being operatively connected to said cycle control mechanism and including an upper clamp and a lower clamp adapted to grip the free longitudinal edges of the upper and lower plies of said centre-folded film, during the infeed of an article through said article-receiving opening by said article infeed means, to firmly and fully seat said article within the folded edge portion of said film without wrinkling said plies.

8. Apparatus as specified in claim 1 wherein: said powered film supply means includes freely revolvable roll means supporting said film on said apparatus at a location in advance of said readiness station, dancer roll means associated with said film roll means and brake shoe and brake disc means operatively connected to said dancer roll means for halting rotation of said roll in the absence of tension on film being drawn off said roll means.

9. Apparatus as specified in claim 3, plus:
an upstanding side guide on said separator and means mounting said side guide and separator for lateral sliding movement on said apparatus,
whereby said side guide and separator may be moved laterally as a unit to adjust for a run of articles of different widths on said article delivering belt and automatically adjust for corresponding widths of said centre folded film.

10. Apparatus as specified in claim 1, plus static elimination means extending transversely thereof and conductively connecting the full width of said film to a ground.

11. Apparatus for individually and successively heat sealing and severing a plurality of articles at a heat sealing station on a path, said apparatus comprising:
article conveyor belt means extending along said path through said station,
means to support a web of centre folded, heat sealable plastic supported on a roll at one end of said path, said web extending along said path through a readiness station located in advance of said sealing station;
film ply separator and clamping means along said path proximate said readiness station for creating an article receiving opening at the unfolded edges of said film and temporarily clamping said edges to avoid wrinkling of said film;
article infeed means mounted alongside said path, opposite said article receiving opening, for moving each successive article through said opening transversely over the lower ply and under the upper ply of said film into said readiness station;
heat sealing and severing means at said heat sealing station on said path, for sealing said plastic around each said article at said station and severing said web transversely into individual packages;
said means including a pair of opposed L-shaped heating members, each supported on a plurality of pistons and air cylinders to move toward each other, meet intermediate of the height of each article and apply equalized pressure along said members,
and automatic, cycle-control mechanism operatively connected to all of said means for moving each successive article from station to station and controlling the application of sealing and severing heat at said sealing station.

12. A method for heat sealing a plurality of articles individually and successively within a centre-folded, heat sealable, film and severing said film enclosed articles into individual packages by means of a pair of oppositely disposed L-shaped heat sealing bars, said method comprising the steps of
supporting an elongated web of said centre-folded film with the lower ply on a horizontal plane and supporting a section of the upper ply on a higher plane to define an article-receiving opening at said section;
feeding a succession of said articles to said article-receiving opening and periodically moving successive endmost articles into said opening, over said lower ply and under said upper ply until enclosed within said film;
periodically applying a compressive force on opposite exterior faces of said upper and lower plies to pinch each successive article so enclosed within said film and then moving said article, while so pinched, into sealing position between said bars, thereby advancing said web and creating an article receiving opening for the next successive article;
halting each successive article at said sealing position, closing said sealing bars on said film, applying heat to said bars for sealing and severing said film and then opening said bars and
then moving each sealed and severed film enclosed article away from said sealing position, moving the next successive article into said sealing position and feeding the then endmost article in said succession of articles through said article receiving opening.

References Cited

UNITED STATES PATENTS

| 3,320,111 | 5/1967 | Lucia et al. | 53—182X |
| 3,327,451 | 6/1967 | Forman | 53—182 |
| 3,429,100 | 2/1969 | Zelnick et al. | 53—182 |

THERON E. CONDON, Primary Examiner

E. F. DESMOND, Assistant Examiner

U.S. Cl. X.R.
53—55, 74, 75, 182